United States Patent [19]

McGrail et al.

[11] Patent Number: 4,970,271

[45] Date of Patent: Nov. 13, 1990

[54] AROMATIC POLYMER

[75] Inventors: Patrick T. McGrail, Saltburn; Ian W. Parsons, Borneville; Paul D. MacKenzie, Guisborough, all of England

[73] Assignee: Imperial Chemical Industries PLC, London, England

[21] Appl. No.: 298,422

[22] Filed: Jan. 18, 1989

[30] Foreign Application Priority Data

Jan. 20, 1988 [GB] United Kingdom ............... 8801225

[51] Int. Cl.$^5$ ................ C08G 8/02; C08G 65/48
[52] U.S. Cl. ................................ 525/390; 528/125; 528/126; 528/128
[58] Field of Search ............... 525/390; 528/125, 126, 528/128

[56] References Cited

U.S. PATENT DOCUMENTS

| | | | |
|---|---|---|---|
| 4,530,703 | 7/1985 | Malon et al. | 55/16 |
| 4,540,737 | 9/1985 | Wissbrun et al. | 524/599 |
| 4,690,765 | 9/1987 | Linder et al. | 210/654 |
| 4,690,766 | 9/1987 | Linder et al. | 210/654 |

FOREIGN PATENT DOCUMENTS

| | | |
|---|---|---|
| 0061424 | 9/1982 | European Pat. Off. |
| 0130963 | 1/1985 | European Pat. Off. |
| 2214675 | 8/1974 | France |

*Primary Examiner*—John Kight, III
*Assistant Examiner*—P. Hampton Hightower
*Attorney, Agent, or Firm*—Cushman, Darby & Cushman

[57] ABSTRACT

An aromatic polymer comprises divalent aromatic units linked through oxygen, characterized in that some at least of those units are or contain aromatic rings free of electron-withdrawing groups and in that at least one of such rings carries at least one nitrogen radical linked to a nuclear carbon atom by a nitrogen-carbon bond.

Preferably it consists to the extent of at least 75 mol percent by the repeating units:

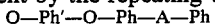

O—Ph'—O—Ph—A—Ph      I alone or in combination with

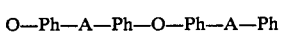

O—Ph—A—Ph—O—Ph—A—Ph      II where
Ph is paraphenylene;
Ph' is phenylene, at least some of groups Ph' carrying a nitrogen radical;
A is $SO_2$ or CO; and
the As can be the same or different in the polymer chain.

A process is provided which comprises nitrating a parent polymer and optionally reducing nitro groups to amino followed optionally by substitution of amino.

12 Claims, No Drawings

AROMATIC POLYMER

This invention relates to an aromatic polymer and more particularly to a nitrogen-substituted polyarylether.

According to the invention an aromatic polymer comprises divalent aromatic units linked through oxygen characterised in that some at least of such units are or contain aromatic rings free of electron—withdrawing groups and in that at least one of such rings carries at least one nitrogen radical linked to a nuclear carbon atom by a nitrogen-carbon bond.

By "nitrogen radical" is meant a radical in which at least one valency of nitrogen is occupied by the linkage to nuclear carbon and the others are linked to one more more of hydrogen, carbon or a polyvalent inorganic atom such as oxygen or nitrogen. Normally the nitrogen-carbon bond is single, but the invention includes compounds in which that bond is double, for example as the result of tautomerism. Among the radicals are nitro, amino, alkylamino, acylamide, diacylimido and arylazo.

The aromatic units of the polymer preferably include multiple units in which divalent aromatic radicals are linked together through a direct link or through single atom groups other than oxygen or through alkylene. By "single atom group" is meant a divalent atom or an atom or valency greater than 2 carrying substituent(s) satisfying valency in excess of 2. Such single atom groups include for example electron-withdrawing groups such as CO, $SO_2$ and SO, and electron-donating groups such as dialkylmethylene (totalling up to $C_8$) or $C_2$-$C_6$ polymethylene. Particular examples of suitable multiple units are based on:
biphenyl
benzophenone
diphenyl sulphone
diphenyl thioether
dibenzoylbenzene
bisbenzenesulphonylbenzene
bisbenzoylbiphenyl
bisbenzenesulphonylbiphenyl
diphenylmethane
2,2'-diphenylpropane.

The positions of linkages to and within such multiple units can be mutually ortho, meta or para or a combination of more than one such position. The aromatic units may carry non-reactive small substituents such as methyl or halogen but preferably are free of large side-groups over $C_4$, for example phenyl. Preferably the aromatic units are unsubstituted. Analogous units in the naphthalene series can be present. Preferred polymers contain both electron-withdrawing and electron-donating groups.

Each nitrogen radical-carrying aromatic unit of the polymer is linked to its neighbor in the polymer chain preferably through 2 electron-donating groups or one electron-donating group and one direct link. Preferably it does not carry an electron-withdrawing group. A very convenient such unit is dioxy phenylene, which can readily carry one nitrogen radical if the oxygens are mutually ortho or para or one or two nitrogen radicals if the oxygens are mutually meta. Since the nitrogen radical can be readily introduced to aromatic radicals so linked, polymers of a desired nitrogen radical content can be made by choosing a starting polymer with the appropriate relative proportion of (a) aromatic radicals carrying 2 electron-donating groups or one electron-donating group and one direct link and (b) aromatic radicals carrying at least one electron-withdrawing group. The resulting family of polymers differing in nitrogen content constitutes a particular feature of the invention. The proportion of type (a) radicals can in principle be up to 100% of the total aromatic radicals present. More usefully and conveniently it is up to 50%, such as in a polymer in which type (a) radicals or pairs thereof alternate with type (b) radicals present as units in which two such radicals are linked together through an electron-withdrawing group. A preferred polymer consists essentially of paraphenylene units linked through ether oxygen and alternating with 4,4'-diphenylsulphone; then the proportion of type (a) radicals is 33.3%. The proportion of type (a) radicals can be as low as for example 0.1%, more usually down to 1%. Not all the type (a) radicals need carry a nitrogen radical.

The type (a) radicals can be distributed uniformly or randomly or blockwise in the polymer chain.

An especially convenient polymer is that represented to the extent of at least 75 mol percent by the repeating units

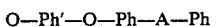
$$O-Ph'-O-Ph-A-Ph \qquad I$$

alone or in combination with

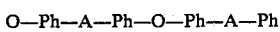
$$O-Ph-A-Ph-O-Ph-A-Ph \qquad II$$

where
Ph is paraphenylene;
Ph' is phenylene, at least some of the groups Ph' carrying a nitrogen radical;
A is $SO_2$ or CO; and
the As can be the same or different in the polymer chain.

When both units are present the percentage molar ratio of I to I+II is in the range 1–99, especially 10–90 and particularly 20–80.

The polymer from which the nitrogen radical-containing polymer is (notionally) derived has a molecular weight ranging from a small oligomer having 2–5 aromatic radicals capable of carrying the nitrogen radical, up to about 100000, which is about the limit of melt-processibility. The range 1000–15000 is especially useful for polymers to be used in solution or to be processed in some way resulting in reaction to increase their molecular weight. The range 8000–50000 is especially useful for processing to self-supporting structures, for example films.

In a first particular polymer according to the invention the nitrogen radical is nitro. It can be made by nitrating a polymer containing type (a) and, to the extent required, type (b) radicals. Nitration is carried out suitably by means of nitric acid in the presence of a dehydrating agent such as sulphuric acid. Although the starting polymer is usually soluble in concentrated sulphuric acid, it is preferred to dissolve the starting polymer in an organic solvent before nitrating, if it is desired to avoid sulphonating the polymer or if the polymer tends to degradation. A suitable solvent is nitrobenzene.

The fraction of type (a) radicals nitrated can be controlled by choice of temperature, time, nitric acid concentration and quantity, and acidity of the nitration reaction mixture.

The nitro polymer has uses in its own right based on its physical properties; it is especially useful as an intermediate for making other polymers according to the invention.

In a second particular polymer according to the invention the nitrogen radical is primary amino. The invention provides a process for making it by reducing the above-mentioned nitro polymer. Reduction can be by for example catalytic hydrogenation, but is more conveniently by means of a soluble reducing agent. In a preferred process, the nitro polymer is reduced in solution in a water soluble organic liquid, especially a polar aprotic solvent such as a lower alkylamide such as DMF or DMAC. A suitable reducing agent is a low valency salt of sulphur, especially dithionite.

The amino polymer is usable as a curing agent for epoxy resins, and may be used itself as a thermoset resin in presence of a polyfunctional cross-linking agent such as formaldehyde, formaldehyde ethers such as methoxymethyl-melamines or—ureas dialdehydes, diacidchlorides or di-acidanhydrides. It is especially useful as an intermediate in making polymers according to the invention in which other nitrogen radicals are present. In a third particular polymer according to the invention the nitrogen radical is N-substituted amino. The following polymers are provided:

With simple hydrocarbon substituents: these are for example alkyl groups having each up to 6 carbon atoms; 2 or 3 such groups may be present and may be joined externally to form a ring. When 3 such groups are present, the nitrogen atom is positively charged and its hydroxide is a strong base. One or 2 such groups provide basic strength rather higher than the primary amino polymer, with possibly adjusted hydrophobic properties. The resulting positively charged polymers are of use as antistatic coatings, with application appropriate to their higher basicity.

With substituted hydrocarbon substituents: these make possible a variety of functions. Thus alkyl groups as above mentioned can carry hydroxy or amino or carboxy or sulphonic acid substituents. More specifically, the substituent can be maleyl, so that the polymer carries maleimide groups and is cross-linkable directly or by reacting with for example a divinyl compound such as 4,4'-bis-maleimido-diphenylmethane or 4,4'-or 3,3'-bismaleimido-diphenylsulphone, or a dialkyl compound such as phthalate or bisphenol A diether, or a diamine such as a diamino diphenyl methane. The maleimide content may be chosen to give a material processable as a thermosetting resin. In another example the substituent is glycidyl and the polymer is an epoxy resin precursor.

With nitrogen substituents: these are for example the diazonium ion and azo compounds such as are formed by coupling the diazonium ion with phenols or active-hydrogen compounds.

The invention provides the following further embodiments of the polymers.

Mixtures with anionic polymers, for example the sulphonated polymers of our EP-A-8894, 8895 and 41780;

Aqueous solutions or dispersions, possibly containing pigment, for use as surface coatings.

Composites, in which they are formulated with fibers, especially continuous carbon or glass, and are laid up to give laminates of a required level of isotropy.

EXAMPLE 1

(a) A copolymer (25.0 g) containing 60 mole % I and 40 mole % II (A=SO$_2$, Ph'=paraphenylene), was dissolved in nitrobenzene (200 ml). To the resulting solution was added a mixture of concentrated sulphuric acid (98% w/w, 5 ml) and concentrated nitric acid (2 ml). The mixture was thereafter stirred at room temperature for 3 hours. The polymer solution was then poured into methanol (500 ml) in a Waring blender and macerated. The yellow precipitate was filtered, blended again with methanol and purified by Soxhlet extraction. The polymer was finally dried under reduced pressure in an oven.

(b) Copolymers containing the same repeat units in the molar ratios 10:90, 5:95 and 1:99 were nitrated by a similar procedure. The products analysed by $^{13}$C 22.5 MHz and $^1$H 400 MHz nuclear magnetic resonance (nmr) spectroscopy showed mononitration on all of dioxyphenylene units, but no nitration on any of the repeat units II. All the products were found to be soluble in dipolar aprotic solvents and halogenated hydrocarbons.

EXAMPLE 2

(a) Example 1 (a) was repeated using a smaller quantity of nitrating agent, namely concentrated sulphuric acid (0.96 ml) and concentrated nitric acid (0.60 ml). 400 MHz $^1$H spectroscopy showed 30% of the dioxyphenylene units to be mononitrated in the polymer chain but no nitration on any of the repeat units II. In a similar fashion copolymer samples nitrated using still smaller amounts of nitrating mixture were shown by 400 MHz $^1$H nmr spectroscopy to have undergone mononitration on respectively of the order of 10%, 5% and 1% of the dioxyphenylene units, whilst repeat unit II remained unreacted.

EXAMPLE 3

The nitro groups in the copolymers described in Examples 1 and 2 were reduced using N,N-dimethylformamide (DMF) and sodium dithionite. The reduction of nitrated 60 mole % I/40 mole % II is described as a typical example. The nitrated 60 mole % I/40 mole % II copolymer of Example 1 (5.0 g) was dissolved in DMF (100 ml). To the yellow solution was then added sodium dithionite (6.0 g) and the mixture refluxed for six hours. The hot mixture was filtered and the filtrate cooled. The filtrate was poured into methanol (100 ml). The yellow precipitate was filtered and blended successively with methanol, water and lastly with methanol again. The polymer was dried under reduced pressure in an oven. The polymer was characterised by 400 MHz $^1$H nmr spectroscopy and showed that substantially all the nitro groups on the dioxyphenylene units had been converted to amino. Similarly the reduction of other nitrated copolymers of Examples 1 and 2, using different quantities of copolymer and sodium dithionite, were carried out and confirmed by 400 MHz $^1$H nmr spectroscopy.

EXAMPLE 4

The copolymers from example 3 were reacted with cyclic anhydrides (maleic anhydride, phthalic anhydride and succinic anhydride) to give pendant imide groups. The conversion of aminated 60 mole % I/40 mole % II copolymer is described as a typical example. A copolymer (5.0 g) of composition 60 mole % I and 40 mole % II containing monoamino groups on all its dioxyphenylene units was dissolved in 1,1,2,2-tetrachloroethane (100 ml). To the yellow solution was added a mixture of phthalic anhydride (2.65 g) in acetic acid (20 ml). The resulting solution was refluxed for six hours, then cooled and poured into methanol. The precipitate was filtered and blended with methanol, water and methanol, successively. Finally the polymer was dried under reduced pressure in an oven. The polymer analysed by 400 MHz 'H nmr spectroscopy was found to contain on the dioxyphenylene units monosubstitution with phthalimide groups.

What is claimed is:

1. A polymer comprising divalent aromatic units linked through oxygen, characterised in that some at least of those units are or contain aromatic rings free of electron-withdrawing groups and in that at least one of such rings carries at least one nitrogen radical linked to a nuclear carbon atom by a nitrogen-carbon bond.

2. A polymer according to claim 1 containing also multiple units in which divalent aromatic radicals are linked together through a direct link or a single atom group other than oxygen or through alkylene.

3. A polymer according to claim 1 in which the unit carrying the nitrogen radical is dioxyphenylene.

4. A polymer according to claim 3 which is represented to the extent of at least 75 mol percent by the repeating units.

   I alone or in combination with

   II where
Ph is paraphenylene;
Ph' is phenylene, at least some of groups Ph' carrying a nitrogen radical;
A is $SO_2$ or CO; and
the As can be the same or different in the polymer chain.

5. A polymer according to claim 1 in which the nitrogen radical is nitro, primary amino or N-substituted amino.

6. A polymer according to claim 5 in which the nitrogen radical is maleimido.

7. A process for producing a polymer according to claim 1 in which the nitrogen radical is nitro, which comprises nitrating a starting polymer comprising oxygen-linked aromatic units at least some of which contain aromatic rings free of electron-withdrawing groups at a temperature and for a period of time sufficient to result in nitration of said starting polymer.

8. A process according to claim 7 in which the polymer in solution in an organic solvent is reacted with nitric acid and sulphuric acid.

9. A process for producing a polymer according to claim 1 in which the nitrogen radical is primary amino, which comprises contacting a corresponding nitropolymer with a reducing agent under reducing reaction conditions sufficient to form said polymer.

10. A process according to claim 9 in which the polymer is reacted with a low valency salt of sulphur.

11. A process according to claim 7 wherein nitration is conducted at about room temperature.

12. A process according to claim 9, wherein said nitropolymer is reduced in a water soluble organic liquid.

* * * * *